US010821559B2

(12) United States Patent
Francois et al.

(10) Patent No.: US 10,821,559 B2
(45) Date of Patent: Nov. 3, 2020

(54) METHOD FOR OBTAINING A WELDING ELECTRODE

(71) Applicant: LEBRONZE ALLOYS, Suippes (FR)

(72) Inventors: Nicolas Francois, Prunay (FR); Thierry Soreau, Sarry (FR); Francois Primaux, Isles sur Suippes (FR)

(73) Assignee: LEBRONZE ALLOYS, Suippes (FR)

( * ) Notice: Subject to any disclaimer, the term of this patent is extended or adjusted under 35 U.S.C. 154(b) by 380 days.

(21) Appl. No.: 15/735,701

(22) PCT Filed: Feb. 10, 2016

(86) PCT No.: PCT/FR2016/050297
§ 371 (c)(1),
(2) Date: Dec. 12, 2017

(87) PCT Pub. No.: WO2016/203122
PCT Pub. Date: Dec. 22, 2016

(65) Prior Publication Data
US 2020/0030920 A1   Jan. 30, 2020

(30) Foreign Application Priority Data

Jun. 16, 2015 (FR) ..................... 15 55474

(51) Int. Cl.
*B23K 35/32* (2006.01)
*B23K 35/22* (2006.01)
(Continued)

(52) U.S. Cl.
CPC .......... *B23K 35/302* (2013.01); *B22D 11/004* (2013.01); *B23K 35/0255* (2013.01); *B23K 35/222* (2013.01); *B23K 35/402* (2013.01)

(58) Field of Classification Search
CPC ............ B23K 35/0205; B23K 35/0244; B23K 35/0255; B23K 35/0261; B23K 35/0266;
(Continued)

(56) References Cited

U.S. PATENT DOCUMENTS 3,770,427 A * 11/1973 Petersen .............. B23K 35/304
219/146.23
3,787,658 A *  1/1974 Kammer ............ B23K 35/3053
219/146.23
(Continued)

FOREIGN PATENT DOCUMENTS

EP       0256215 A1   2/1988
EP       1650318 A2   4/2006
(Continued)

*Primary Examiner* — Hung D Nguyen
(74) *Attorney, Agent, or Firm* — Craft Chu PLLC; Andrew W. Chu

(57) ABSTRACT

An electrode in which the metallurgical structure of the active surface includes incoherent chromium precipitates, more than 90% of which have a surface of projection of less than 1 $\mu m^2$, the incoherent chromium precipitates having a size at least between 10 and 50 nm. The electrode further has a fibrous structure that is visible in a cross-section of the active surface of the electrode following surfacing and chemical etching. The fibrous structure includes a plurality of radial fibers having a thickness of less than 1 mm and of a substantially central fiberless region that has a diameter of less than 3 mm. The electrical conductivity of the electrode is greater than 85% IUPAC. The method for obtaining the electrode in a continuous casting process as well as to a use of the electrode in a resistive spot welding process.

8 Claims, 3 Drawing Sheets

(51) Int. Cl.
*B23K 35/30* (2006.01)
*B22D 11/00* (2006.01)
*B23K 35/02* (2006.01)
*B23K 35/40* (2006.01)
*B23K 9/24* (2006.01)

(58) Field of Classification Search
CPC ...... B23K 35/22; B23K 35/222; B23K 35/24; B23K 35/302; B23K 35/3033; B23K 35/304; B23K 35/3053; B23K 35/3066; B23K 35/3073; B23K 35/3086; B23K 35/3602; B23K 35/3605; B23K 35/3607; B23K 35/3608; B23K 35/368; B23K 35/40; B23K 35/402; B23K 35/406; B22D 11/00; B22D 11/04; C22C 9/00; C22C 9/01; C22C 9/02; C22C 9/04; C22C 9/06; C22C 9/10
USPC ................. 219/119, 137 WM, 146.1–146.52
See application file for complete search history.

(56) References Cited

U.S. PATENT DOCUMENTS

| | | | | |
|---|---|---|---|---|
| 4,010,309 A | * | 3/1977 | Petersen | B23K 35/302 |
| | | | | 219/145.23 |
| 5,032,358 A | * | 7/1991 | Helenius | B23K 35/222 |
| | | | | 219/119 |
| 2006/0086697 A1 | * | 4/2006 | Nippert | B23K 35/302 |
| | | | | 219/119 |
| 2014/0027426 A1 | * | 1/2014 | Hutchison | B23K 35/3608 |
| | | | | 219/146.1 |

FOREIGN PATENT DOCUMENTS

| | | |
|---|---|---|
| FR | 1313451 A | 12/1962 |
| FR | 2520757 A1 | 8/1983 |
| FR | 2771038 A1 | 5/1999 |
| FR | 2855438 A1 | 12/2004 |
| JP | S58177429 A | 10/1983 |

* cited by examiner

METHOD FOR OBTAINING A WELDING ELECTRODE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention is related to the field of the welding electrodes.

The invention is more particularly related to copper resistance welding electrodes. Such electrodes are used, for example, for spot resistance welding, for assembling sheets together.

These sheets, once they are welded and assembled, have an application namely in the field of the automotive industry.

2. Description of Related Art Including Information Disclosed Under 37 CFR 1.97 and 37 CFR 1.98

The welding of two sheets is performed by the combination of a high electrical current density and a point pressure, also referred to as "clamping force".

More particularly, in a first step, the clamping force between said two sheets to be assembled is increased. Then, during a second phase, and once the two sheets are clamped, current is caused to pass between two electrodes, which are arranged on both sides of said sheets.

The passing through of the current between the two electrodes causes an increase in temperature at the level of the area involved of the sheets, up to the melting point between the two sheets.

The pressure maintains the contact between the electrode and the sheet assembly. In order to weld, a clamp presses the assembly with copper electrodes, which material is both an excellent electricity- and heat-conductive material. This choice permits to reduce the heated area, which is limited to the area of contact between the two sheets to be welded.

Once the melting point is reached, the pressure is maintained, and the electrical current density is stopped to cool the welding point before separating the electrodes from the assembled sheets, then proceeding to the next welding point.

The welding parameters are thus dependent on the electrical resistance of the sheets, the interface resistance between the sheets and the electrode, the total thickness of the assembly and the diameter of the electrodes. This process is commonly used for assembling small-thickness sheet steel (<6 mm). This technique benefits from a very important know-how and a good productivity.

Generally, for the manufacture of traditional welding electrodes the documents of the state of the art teach to implement methods aimed at obtaining a product structure that is as homogeneous as possible, and including grains having the smallest possible size.

More specifically, the traditional welding electrodes, having a metallurgical structure with small-size grains, are obtained according to the following method:

1) melting and casting in a mold, then solidification in order to obtain a bar having a diameter generally between 150 and 350 mm;
2) spinning at a temperature between 980 and 1040° C. in order to obtain a diameter of 20 to 30 nm and quenching or spinning at a temperature above 850° C., followed by a heat treatment at a temperature between 980 and 1040° C., then quenching;
3) stretching in order to obtain a bar with a diameter generally between 12 and 19 mm;
4) aging or tempering treatment;
5) shearing of the bar in order to obtain pieces, then punching in order to provide the electrode with its final shape or machining starting from the bar by removal of material in order to obtain the final shape of the electrode.

The step 2) of hot working of the above method permits to obtain an electrode with an extremely fine and homogeneous recrystallized metallurgical structure, namely characterized by a micrometric grain size, typically of about 10 µm.

As regards the size of the grains, for example, from patent document FR 2 855 438 for example is known a copper alloy with other metals chosen among chromium, zirconium, iron, phosphorus and silver, these elements being present in a total weight proportion of less than or equal to 1.5%. Such alloys would permit to increase the life of the electrodes. This document teaches to reduce the grain size to less than 10 µm in order to increase the yield strength of the alloy being obtained.

Patent document FR 2 771 038 in turn relates to a method for manufacturing a copper-based alloy spot resistance welding electrode, which permits to obtain a structure having a structure including copper grains the size of which is between 0.1 and 0.4 µm.

Also known, from document EP 0 256 215, is a method permitting to obtain a grain structure the size of which is between 30 and 100 µm.

The document JP 58 177 429 A related to a copper alloy having a high strength and which is namely applicable to spot welding electrodes also teaches to reduce the size of the grains by adding tantalum to the composition of the alloy.

Nevertheless, the successive welding cycles lead to wear of the surface of the electrode, and more particularly of the active face of the electrode, which is into contact with the sheet.

There are mainly two phenomena of wear of the traditional electrodes.

On the one hand, the surface layer of the electrode is likely to detach laterally, because it is subjected to particularly high temperatures. This wear phenomenon is referred to as creep.

On the other hand, the contact between the sheet and the electrode generates a mutual chemical material transfer reaction between the sheet and the electrode. In addition, this corrosion phenomenon is increased due to the presence of zinc at the level of the coating of the sheets to be assembled. Indeed, the zinc of the coating of the sheet diffuses into the copper of the surface of the electrode, forming a β-phase, or yellow layer, which iron atoms from the sheet are likely to stick to. This sticking induces tearing of material from the surface of the electrode during the opening of the welding clamp, which will accelerate the surface degradation of said electrode.

Due to these creep and corrosion phenomena, the traditional electrodes have a limited duration of operation. They widen at their end, which modifies the parameters, namely by reducing the current density, thus resulting into a deterioration in the quality of the welded spot.

The manufacturers must therefore look for solutions to delay or compensate for the degradation of the surface of the electrode.

Under usual welding conditions, some actions carried out by the manufacturers are sufficient, for example a modification of the shape of the electrode, a surface grinding or an incrementation of the current.

However, in recent times, the manufacturers have sought to increase, on the one hand, the welding sequences on robotized metal fitting lines and, on the other hand, the clamping forces on the high yielding strength sheets. In addition, it is also sought to reduce the thickness of the sheets, or also to carry out asymmetrical or triple thickness welding operations.

These recent advances are responsible for a greater thermomechanical stress on the electrodes.

Now, given these developments, it is important to keep perfect control over the quality of the welded spot.

BRIEF SUMMARY OF THE INVENTION

Therefore, the present invention relates namely to a method for manufacturing welding electrodes having a better resistance to wear phenomena and, hence, welding performances higher than the traditional electrodes.

To this end, the invention namely relates to a welding electrode made of an alloy of copper, chromium, zirconium and including in addition phosphorus and/or magnesium.

Said electrode is namely likely to be obtained by means of a method as described below and includes a proportion of chromium between 0.4 and 0.8% by weight and a proportion of zirconium between 0.02 and 0.09% by weight.

The total proportion of phosphorus and/or magnesium is higher than 0.005% by weight, the proportion of magnesium is less than 0.1% by weight and the proportion of phosphorus is less than 0.03% by weight.

The rest of the composition consists of copper.

The structure of the electrode includes incoherent chromium precipitates, more than 90% of which have a projected surface area of less than 1 pmt, and said incoherent chromium precipitates have dimensions at least between 10 and 50 nm. Said electrode has in addition a fibrous structure, visible in a cross-sectional view of the active face of said electrode after surfacing and chemical etching, said structure being comprised, on the one hand, of a plurality of radial fibers, said fibers having a thickness of less than 1 mm, preferably less than 0.5 mm and, on the other hand, a substantially fiberless central zone having a diameter of less than 5 mm, preferably less than 3 mm and the electrical conductivity of said electrode being higher than 85% IACS (for International Annealed Copper Standard).

The invention relates in addition to a method for manufacturing a continuous casting welding electrode from an alloy including at least copper, chromium in a proportion between 0.4 and 0.8% by weight, zirconium in a proportion between 0.02 and 0.09% by weight, said alloy also including phosphorus and/or magnesium in a total proportion higher than 0.005% by weight, the proportion of magnesium being less than 0.1% by weight and the proportion of phosphorus being less than 0.03% by weight, the remainder of the composition being copper, said method including at least the following steps:

a) melting of the various components of the alloy, namely at least copper, chromium, zirconium and phosphorus and/or magnesium at a temperature above 1200° C., preferably between 1200° C. and 1300° C.;

b) continuous casting through a cylindrical die having a diameter d, which permits to obtain a bar having a diameter close to the diameter d of the die made with a temperature for maintaining the metal liquid in the casting furnace between 1100 and 1300° C., preferably between 1150 and 1250° C.;

c) solidification of said bar and cooling to a temperature below 100° C., the cooling rate being at least equal to 10° C./s from 1060° C. (end of solidification), at least equal to 15° C./s from 1040° C., at least equal to 20° C./s from 1030° C., at least equal to 25° C./s from 1000° C., at least equal to 30° C./s from 900° C. and at least equal to 20° C./s for temperatures below 900° C.

In other words, the cooling rate is at least equal to 10° C./s when the temperature of the bar is above 1060° C. until it reaches this temperature, then at least equal to 15° C./s when the temperature is between 1060 and 1040° C., then at least equal to 20° C./s when the temperature is between 1040 and 1030° C., then at least equal to 25° C./s when the temperature is between 1030 and 1000° C., then at least equal to 30° C. between 1000 and 900° C.

Then, for bar temperatures below 900° C., the cooling rate may be at least equal to 20° C./s until the bar is cooled down to a temperature of not more than 100° C.

d) cold deformation in order to obtain a bar having a diameter of less than 20 mm;

e) aging or tempering treatment;

f) shearing said rod in order to obtain pieces, then punching or machining by removal of material in order to provide said electrode with its final shape, wherein the metallurgical structure of the active face of said electrode includes incoherent chromium precipitates, more than 90% of which have a projected surface area of less than 1 pmt, said incoherent chromium precipitates having dimensions between at least 10 and 50 nm, said electrode having in addition a fibrous structure, visible in a cross-sectional view of the active face of said electrode after surfacing and chemical etching, said structure being comprised, on the one hand, of a plurality of radial fibers, said fibers having a thickness of less than 1 mm, and, on the other hand, a substantially fiberless central zone having a diameter of less than 3 mm, and the electrical conductivity of said electrode being higher than 85% IACS (for International Annealed Copper Standard).

According to other optional features of the method:

the casting step b) is carried out while maintaining a liquid metal temperature in the casting furnace between 1150 and 1250° C.;

the cooling of the bar in step c) is performed at a cooling rate at least equal to 30° C./s for temperatures below 900° C.; in other words, for bar temperatures below 900° C., and namely between 900 and 700° C., the cooling rate is preferably at least equal to 30° C./s until the bar is cooled down to a temperature of not more than 100° C.

the aging treatment of step e) is carried out at a temperature between 450 and 550° C. for a time period between 1 and 2 h, or at a temperature of 550° C. for a time period between 10 and 30 min, or at a temperature of 500° C. for a time period between 30 min and 2 h, or at a temperature of 450° C. for a time period between 2 and 6 h, or at a temperature of 400° C. for a time period of more than 20 h;

said diameter d of the die is between 20 and 70 mm, preferably between 20 and 40 mm;

during cold deformation step d), an external machining operation, less than 0.5 mm thick, is performed in order to remove the surface defects generated during the solidification step c).

Finally, the invention also relates to a use of the electrode in a spot resistive welding method, for welding at least two steel sheets coated with zinc or an alloy comprising zinc, said coating having a thickness of less than 10 μm and said sheets having a thickness of less than or equal to 1.5 mm.

The main advantage resulting from the present invention consists in that the performance and life of the electrodes used namely for spot resistance welding are significantly improved.

More specifically, by means of said electrodes, the quality of the welded spot is substantially improved, namely by increasing the protection against corrosion at the level of the welded spots. It can also be considered by the manufacturers to increase the welding rates on the robotized lines, as well as the clamping forces on the high yielding strength sheets. The welded sheets can have a smaller thickness, and said electrodes also permit to carry out asymmetrical welds (more than two sheets, eventually having different thicknesses or the steel of which is different). In addition, the direct welding costs are reduced, namely as regards consumables, labor, and energy.

Further features and advantages of the invention will become clear from the following detailed description related to an exemplary embodiment given by way of an indication and non-restrictively.

BRIEF DESCRIPTION OF THE SEVERAL VIEWS OF THE DRAWINGS

The understanding of this description will be facilitated when referring to the attached drawings.

In the attached drawings:

FIG. 2A is a photographic illustration, representing, after chemical etching, a longitudinal cross-sectional view taken with an optical microscope of the structure of the electrode obtained by implementing the method according to the present invention, after the punching step, while

DETAILED DESCRIPTION OF THE INVENTION

Figure 1:
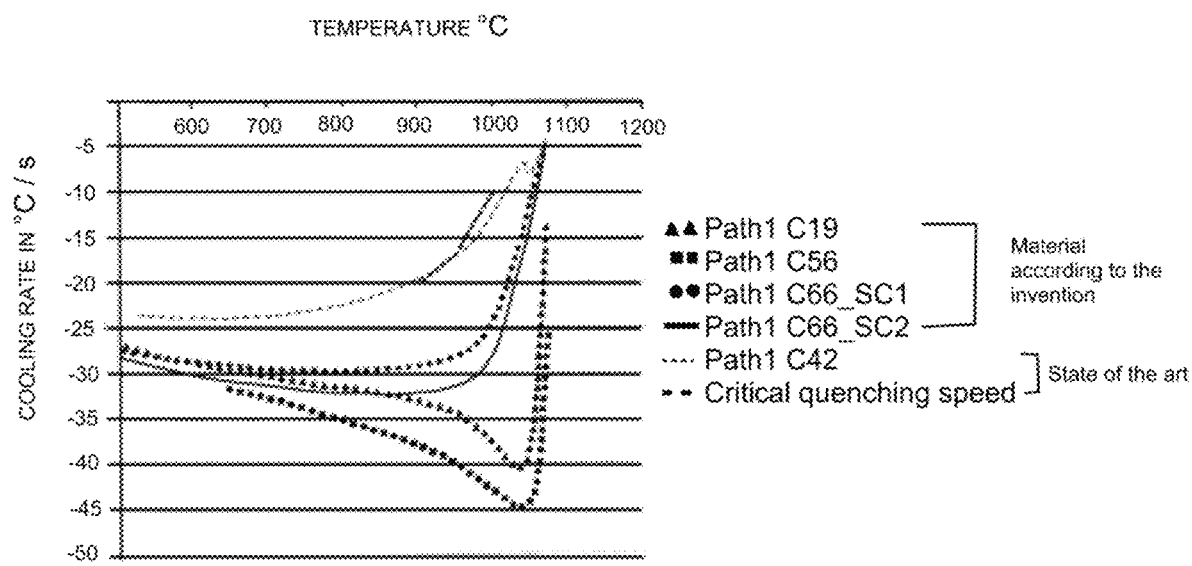
FIG. 1 is a graphical representation of the preferred cooling rate (in ordinates—expressed in degrees Celsius per second) as a function of the temperature (in abscissa—expressed in degrees Celsius). The dashed curves represent the speed traditionally applied for a material (PathI_C42) with the usual properties of the state of the art (fine dotted lines) and the critical quenching speed of the state of the art (thick dotted lines). The other curves represent the evolution of the cooling rate applied in the method and permitting to obtain the electrodes according to the invention (Path1 C19; Path1 C56; Path1 C66_SC1 and Path1 C66_SC2).

The present invention relates namely to a method for manufacturing a resistance welding electrode from an alloy the composition of which is comprised of copper, chromium, zirconium, and phosphorus and/or magnesium.

The method for manufacturing the electrode is a continuous casting method and comprises at least the following steps:

(a) the various components of the alloy are fused at a temperature above 1200° C., preferably between 1200° C. and 1300° C.;

(b) a continuous casting is carried out through a cylindrical die, or a cylindrical mold, having a diameter d permitting to obtain a bar;

This casting can be performed at a temperature for keeping the metal liquid in the casting furnace between 1100 and 1300° C., preferably between 1150 and 1250° C.

(c) said bar is solidified and cooled down, preferably at a defined cooling rate, to a temperature below 100° C., the cooling rate being at least equal to 10° C./s until a bar temperature of 1060° C. is reached, then at least equal to 15° C./s between 1060 and 1040° C., then at least equal to 20° C./s between 1040 and 1030°, then at least equal to 25° C./s between 1030 and 1000° C., then at least 30° C./s between 1000 and 900° C., then at least 20° C./s for temperatures below 900° C., until the bar is cooled down to a temperature not higher than 100° C.

The cooling rate is thus at least 20° C./s until at least a bar temperature of 100° C. is reached.

Preferably, the cooling rate is at least 30° C./s for temperatures below 900° C., until the bar is cooled down to a temperature not higher than 100° C.

Advantageously, the cooling of said bar of step c) is carried out at a cooling rate always at least equal to 30° C./s for temperatures below 700° C.

This solidification and cooling step does not include a specific heat treatment, whereby the placing in a solution can occur as from the end of the solidification at 1060° C.

(d) a cold deformation of said bar is carried out in order to obtain a bar with a diameter of less than 20 mm, preferably between 12 and 19 mm; optionally, an outer machining operation, preferably less than 0.5 mm thick, may be performed so as to remove the surface defects eventually generated by the previous step;

(e) an aging treatment, or tempering treatment, is carried out, during which the bar is heated, and finally (f) a shearing of said bar is carried out in order to obtain pieces, then a punching or a machining by removal of material in order to provide said electrode with its final shape.

The aging treatment is a heat treatment that can be carried out in different ways.

Indeed, it can be carried out at a temperature between 450 and 500° C. for a period of time of 1 to 2 hours, or at 550° C. for 10 to 30 minutes, or at 500° C. for 30 minutes to 2 hours, or at 450° C. for 2 h to 6 h, or at 400° C. for more than 20 h.

Particularly advantageously, in step b) of the method according to the invention, the diameter d of the cylindrical continuous casting die is smaller than 70 mm.

Preferably, said diameter d is between 20 and 70 mm and, yet more preferably, this diameter is between 20 and 40 mm.

In addition, the cooling rate applied during step c) of the method and permitting the solidification of the bar, then solid cooling, is particularly important, resulting into a quick solidification and extremely powerful peripheral cooling.

Preferably, the cooling rate is also varying depending on the temperature of said bar.

More specifically, said cooling rate is advantageously at least equal to 10° C./s when the bar has a temperature higher than 1060° C., then at least equal to 15° C./s when the temperature is between 1060 and 1040° C., then at least equal to 20° C./s when the temperature is between 1040 and 1030° C., then at least equal to 25° C./s when the temperature is between 1030 and 1000° C., then at least equal to 30° C./s between 900 and 1000° C. For bar temperatures below 900° C., the cooling is preferably carried out at a speed of at least 20° C./s.

The cooling rate can also be at least equal to 30° C./s for temperatures below 900° C.

The preferred cooling rates of the present method are shown in the graph of FIG. 1, in comparison with those of the state of the art represented by the curve in dotted lines. The cooling rate is expressed in ° C./s, depending on the temperature of the bar, which is in turn in ° C.

Preferably, in the method according to the invention, unlike in the traditional method, the cooling is not applied to a solid, but to a liquid and starts from the solidus, i.e. at a temperature of about 1070° C. In particular, a temperature range between 1060 and 900° C. has been identified for an improvement in the placing in a solution with a minimum cooling rate that was mentioned above in the definition of the method.

Below 900° C., the placing in solution is impossible, it will be ensured for temperatures below 900° C. to continue the cooling down with a minimum of 20° C./s in order not to generate an uncontrolled aging.

More specifically, the very fast solidification and cooling, to a temperature at which the diffusion of the chromium atoms is limited, permits a homogeneous distribution of the coherent and incoherent chromium precipitates.

These cooling conditions, which are in addition applied to a cylindrical mold having a reduced diameter between 20 and 70 mm, preferably between 20 and 40 mm, contribute to obtaining a bar with a radially oriented columnar solidification texture. This texture is visible by making a transversal cross-section of said bar, and over the entire volume of the latter. On the contrary, such a homogeneity cannot be achieved on foundry bars with a large cross-section obtained by implementing the traditional method, and their texture will be more varying.

The die or the mold, having a cylindrical shape, is preferably surrounded by a jacket in which circulates either an oil or a refrigerant gas, or also water, so as to permit the solidification and the cooling.

Another advantage of the method according to the invention lies in that it permits to avoid a dynamic hot recrystallization, due to a reheating and a simultaneous deformation in the traditional method. As a result, the interesting precipitates and textures resulting from the implementation of the method according to the invention are preserved.

Within the base alloy used for the manufacture of the innovative welding electrodes can preferably be found a chromium content of less than 1% by weight and, yet more preferably, between 0.4 and 0.8% by weight.

By means of the method according to the invention, incoherent chromium precipitates, i.e. particles without crystallographic relationship with the matrix, are in excess of the solubility limit and will be present in a different way than the chromium precipitates resulting from the traditional method that has been described above.

Indeed, in the method according to the invention, the application of the quenching treatment as from the solidification of the alloy, which is complete at a temperature of about 1070° C., permits to maximize the solubility of the chromium in the copper and to maintain the eutectic copper chromium at the grain boundaries.

A proportion of chromium between 0.4 and 0.8% is particularly optimal. Indeed, a proportion lower than 0.4% would not permit to produce the desired chromium precipitation and a proportion higher than 0.8% would be likely to generate chromium precipitates of a too large size, with the appearance of a decohesion during the cold processing step d).

The very fine columnar solidification texture obtained by implementing the method according to the invention particularly advantageously permits to homogeneously distribute the heterogeneity of the chromium composition (chromium in solid solution, eutectic chromium and chromium metal) in the entire volume of the welding electrode obtained by said method.

These chromium precipitates are at the origin of the improvement of the welding performances of the electrode, increasing, on the one hand, the resistance of the latter to hot creep and, on the other hand, delaying or blocking the diffusion of iron and zinc, which are the reason for the chemical corrosion of the active face of said electrode.

The method according to the invention, and namely the preferred application of the cooling as from the solidus, also promotes a homogeneous distribution of the coherent chromium precipitates, i.e. the precipitates having a continuity with the crystallographic structure of the matrix.

By implementing the method according to the invention, the electrode obtained also has a fibrous structure, due to the presence of copper precipitates, or grains, which have in turn a very fiber-like shape.

Figure 2A:
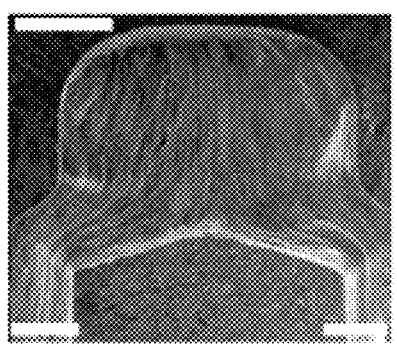
Figure 2B:
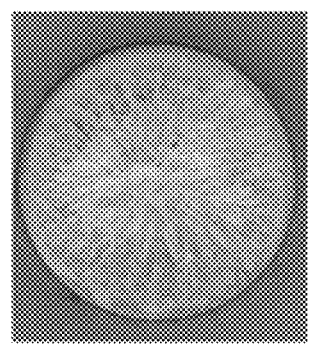
FIG. 2B represents a cross-sectional view of this same electrode.

The fibrous structure is namely visible in FIG. 2A, which shows a longitudinal cross-sectional view of an electrode after punching, as well as in FIG. 2B, which shows a transversal cross-sectional view of said electrode.

According to the longitudinal cross-sectional view of FIG. 2A, it appears that the fiber forming is right-left symmetrical, the fibers starting from the active face, and in the vicinity of the internal cooling face of the electrode and oriented while getting tighter towards the skirt of the electrode.

According to the cross-sectional view of FIG. 2B, the fibers are analogous to the spokes of a wheel the hub of which, corresponding to the central zone of the electrode without distinctive fibers, has a diameter of less than 5 mm, preferably less than 3 mm. The fine radial fibers have in turn a thickness advantageously less than 1 mm, and yet more preferably less than 0.5 mm.

Figure 3:
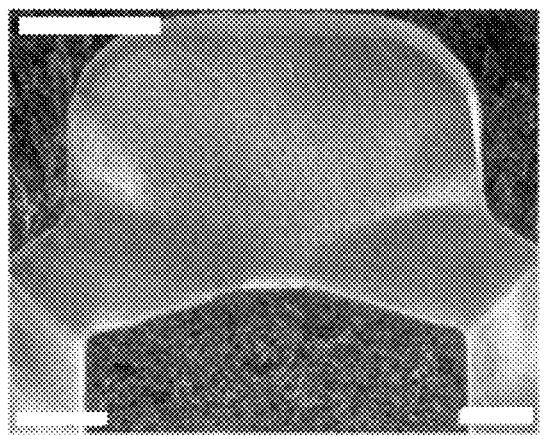
FIG. 3 shows a photographic illustration, representing a longitudinal cross-sectional view of an electrode obtained starting from a method according to the state of the art.

This fiber texture, very characteristic of the electrode obtained by implementing the method according to the invention, is the direct consequence of the metallurgical structure obtained after step c) of said method, and is very different from the fine and homogeneous structure of the electrodes obtained by implementing the traditional method of the state of the art, such a structure being shown in FIG. 3.

The fiber forming of the electrode obtained by the present method, namely due to the presence of needle-like copper grains having a long length, permits an improvement of the resistance to thermomechanical stress fields, comprising the field of deformation and the field of temperature of the active face of said electrode during the welding.

More particularly, the fiber forming of the electrode according to the invention promotes, during the welding of the sheets, a radial and longitudinal evacuation of calories from the central zone of the electrode, where the temperature is maximum, to the cold areas, i.e. the inner face and the periphery of the electrode. As a consequence, the electrode of the invention is more resistant, namely to the creep phenomenon.

The composition of the base alloy to obtain said electrode according to the invention has already been mentioned above. This alloy includes copper and chromium, the latter component being present in the alloy in a proportion advantageously between 0.4 and 0.8% by weight.

Besides these two constituents, the alloy according to the invention also comprises zirconium in a proportion preferably between 0.02 and 0.09% by weight. Such a proportion advantageously permits to avoid generating precipitates, which would be likely to promote cold cracking of the material.

It is also advantageous for the base alloy to include magnesium and/or phosphorus, the combined proportion of these two elements being preferentially higher than 0.005% by weight.

These elements, which are both more deoxidizing than chromium and less than zirconium, facilitate a good control of the residual zirconium content when large quantities of production are considered.

Magnesium may eventually replace zirconium or reduce the proportion of the latter in the alloy, while remaining in a proportion of less than 0.1% by weight. Indeed, a higher magnesium content could lead to a decrease in conductivity of the copper. Likewise, the proportion of phosphorus is preferably less than 0.03% by weight.

The present invention also relates to an electrode likely to be obtained by the method described above.

As already mentioned above, said electrodes according to the invention have original microscopic properties different from those of the traditional electrodes.

Transmission microscopy analyses of the structure of the material of the electrodes according to the invention, before and after welding, have permitted to demonstrate differences with respect to the microscopic structure of the traditional electrodes, and namely on the morphology of the crystalline grains as well as on the dimensions and the distribution of the chromium precipitates.

In particular, it is observed at microscopic scale that the material of the electrode according to the invention includes more than 90% of the incoherent chromium precipitates, which have a projected surface area of less than 1 µm2.

In addition, at nanoscale, in addition to coherent chromium precipitates having dimensions of about 2 to 5 nm, a population of incoherent chromium precipitates with dimensions between 10 and 50 nm is observed, and more specifically between 10 and 20 nm.

These incoherent chromium precipitates are characteristic of the electrodes according to the invention and are not visible at the level of the material of the traditional electrodes.

The analyses carried out also demonstrated a dimensional evolution of these incoherent chromium precipitates during the step of welding of the sheets by means of the electrode of the invention.

Indeed, during welding, a coalescence of the precipitates is observed when approaching the active face of the electrode and, more specifically, incoherent nanometric precipitates of 30 to 50 nm in the β-layer and from 100 to 150 nm in the γ-layer.

Typically, the β-layer of the chemical reaction layer is the farthest away from the surface of the electrode. It is a yellow layer of zinc diffusion in copper, with 40% zinc. At the surface, the chemical reaction layer includes a layer rich in iron, typically 25%, which is formed during the sticking of the sheet to the surface of the electrode at a temperature above 850° C. Finally, between the β-layer and the iron-rich layer is the γ-layer with 55% zinc.

Further analyses carried out on the electrodes of the invention have shown that the incoherent chromium precipitates present in the γ-layer become richer in iron and, as a result, permit to block the diffusion of the iron.

Finally, hot mechanical characterization tests were also conducted on electrodes obtained by the method of the invention. The results of these tests showed that the creep temperature is increased by 100° C. with the present electrodes, with respect to the creep temperature of the conventional electrodes.

More specifically, the creep of the active face of a traditional electrode becomes sensitive, during the welding operation, at a temperature of about 700° C. Indeed, with the softening of the surface of the electrode, there is creep of the surface and cracking of the γ-layer, which promotes a diffusion of the iron in the γ-layer, then in the β-layer in the form of FeZn precipitates. The β-layer becomes resistive, and heats up above 850° C., resulting into the disappearance of the γ-layer. Therefore, the material of the traditional electrode will begin to tear off as welding spots are carried out, resulting into a quick degradation of the welding spot.

On the contrary, for an electrode according to the invention, this creep temperature is about 800° C., which permits to delay the mechanical stressing of the γ-layer, thus promoting the protective maintaining of said γ-layer at the level of the active face of said electrode.

As a result, the electrodes obtained by implementing the present method have an increased life and improved welding performances.

Hereafter is explained in detail a preferred example of implementation of the present method for obtaining electrodes with improved features and performances. This example should however not be considered as limiting the invention.

Example 1: Method for Obtaining an Improved Welding Electrode

In a first step is performed a melting of the constituents of the base alloy, among which copper and chromium in a proportion between 0.4 and 0.8%.

In order to maintain a good copper conductivity, an electrolytic copper grade, i.e. an electrolytically refined copper, is used.

The alloy may also include addition elements (zirconium, magnesium, phosphorus) in the proportions that have been defined above in the description.

Then, the continuous casting step is carried out through a cylindrical mold having a diameter d equal to 28 mm, at an extraction speed between 0.3 and 1 m/min.

The cooling conditions at the exit of the mold are as follows:

The cooling rate at the exit of the die is 10° C./s at 1060° C., 15° C./s at 1040° C., 20° C./s at 1030° C., 25° C./s at 1000° C., 30° C./s at 960° C. and at least 20° C./s for temperatures below 900° C.

In short, the cooling rate respects an inversely increasing curve for temperatures >900° C. with respect to the temperature, so that this speed reaches at least 10° C./s at 1060° C., at least 15° C./s at 1040° C., 20° C./s at 1030° C., 25° C./s at 1000° C., 30° C./s at 960° C. and 30° C./s at 900° C., preferentially higher than 20° C./s for temperatures below 900° C.

The cooling rate, which flows on the outer wall of the mold and evacuates the calories in order to solidify and cool down the electrode material is between 20 and 60 L/min.

Figure 4A:
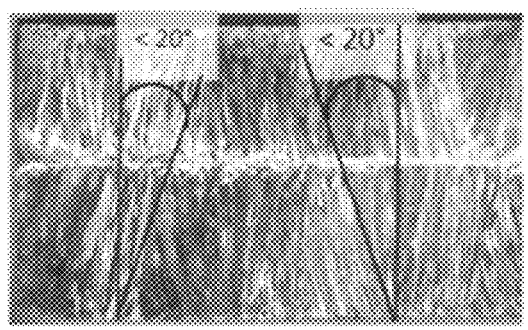
FIGS. 4A to 4D are photographic illustrations, representing the texture necessary for the material of the electrode obtained by implementing the method according to the invention.
Figure 4B:
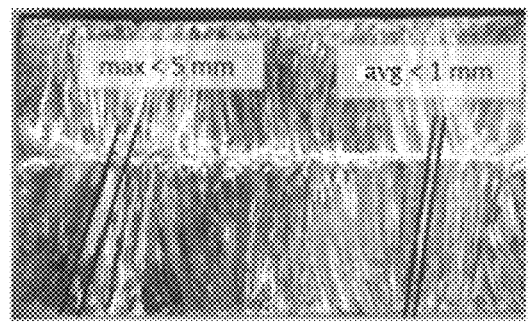
Figure 4C:
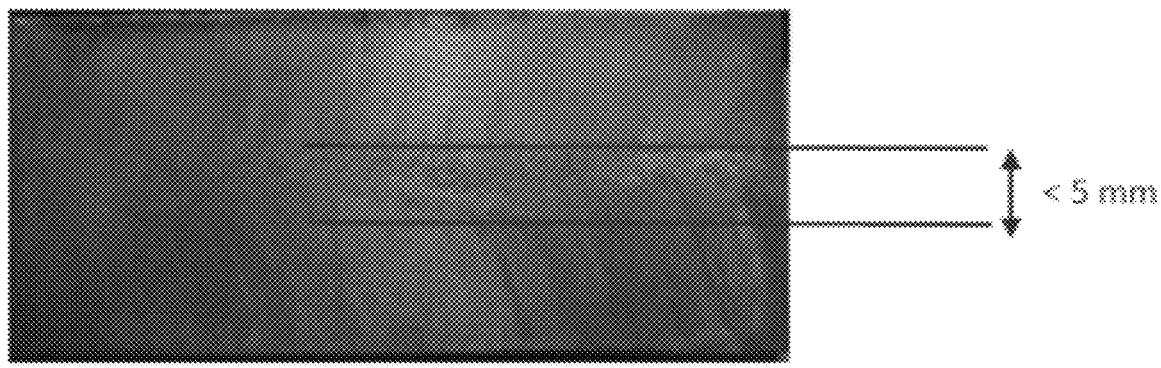
Figure 4D:
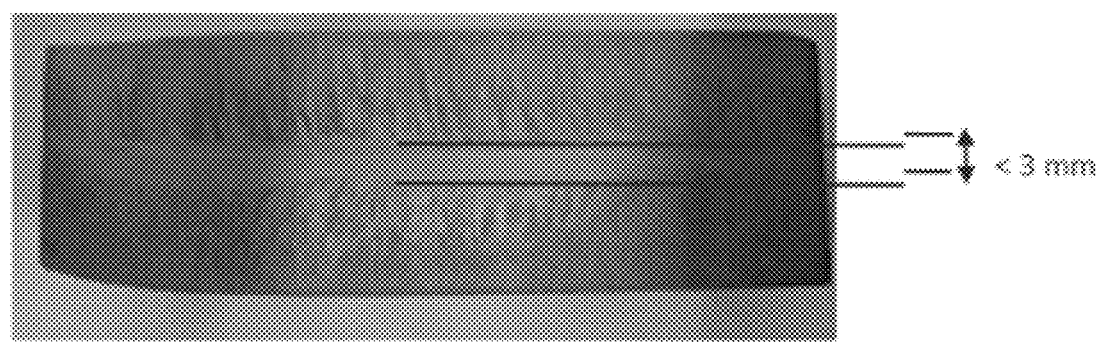

The texture of the bars is then controlled, and this control occurs from the following measurements:

The thermal gradient, the longitudinal component of which is as low as possible, typically less than 20°, is shown in the attached FIG. 4A;

The size of the columnar grains, visible in FIG. 4B, and in particular the width, which should preferably be on average less than 1 mm and at most equal to 5 mm;

The undulation of the solidification axis of the bar, which must advantageously be less than 5 mm, is shown in FIG. 4C;

The fineness of the central zone of the bar, which does not include fiber forming, which is advantageously less than 3 mm, is visible in FIG. 4D.

The following steps of the method of the invention are also implemented and, in particular, the cold deformation steps d) and e) permit to promote a shearing of the incoherent chromium precipitates and their globulization, i.e. their spherical shaping The initial fineness of the incoherent chromium precipitates resulting from the solidification and the importance of the cold deformation will permit to define the density and the dimensions of the precipitates in the final state, and to obtain a population of incoherent precipitates of 10 to 50 nm.

At the end of the method, the conductivity of the electrode and its hardness are controlled before a first welding operation.

Usually, the conductivity of an electrode made of cuprous alloy is set as an IACS percent, or IACS % for International Annealed Copper Standard, with 100% IACS for a conductivity of 58.108 MS/m (proportional) and a resistivity of 172.41 µΩ/cm (anti-proportional).

Advantageously, in order to have interesting performances in welding, the electrical conductivity of the electrode of the invention must be higher than 85% IACS, in other words, higher than 48.8 MS/m, and the Vickers hardness must be higher than 160 HV.

The present invention also relates to a spot resistive welding method implementing the electrode of the invention for welding at least two steel sheets coated with zinc or an alloy comprising zinc, said sheets having a thickness smaller than or equal to 1.5 mm.

Said electrode, as a welding parameter, namely permits to influence the quality of the welded spots, which is improved, as well as the welding rates and the clamping forces on the sheets, which are increased. In addition, by implementing a welding method with said electrode, the corrosion is reduced at the welded spots.

It is also possible to weld sheets having a reduced thickness or different thicknesses, more than two sheets, or sheets of different steel, which is difficult using the electrodes of the state of the art.

Further welding parameters also affect the above-mentioned objectives, and namely the frequency, the density, the number of periods, the clamping force, the clamping and forging cycles, the cooling by water circulation (pressure, flow rate, temperature), the lapping, the composition and thickness of the steel, the oiling of the sheet, the composition and the thickness of the coating.

Specifically, during the welding of sheets to each other, the first area being stressed is the center of the active face. This is due to the curved shape of the active face. Now, in the center of the electrode according to the invention is a fiberless zone, which is less efficient due to its constitution.

As already mentioned, this zone preferably has preferably a diameter smaller than 3 mm, namely when it is desired to obtain an initial diameter of the welded spot of about 6 mm.

Advantageously, in order to improve the welding performance when using the electrodes of the invention, the welding start density is increased and the incrementation is decreased, compared to the welding method using the traditional electrodes.

Two examples below permit to compare the welding performances and the field of weldability of the electrodes of the invention with the traditional electrodes.

Example 2: Sheet Welding Process—Comparison Between a Traditional Electrode and an Electrode According to the Invention We proceeded to the welding of XSG 0.7 mm sheets coated 10 µm at a frequency of 50 Hz and 10 welding periods with traditional electrodes with stepwise increments from 9200 A to 10800 A over 400 spots (conditions 1).

With electrodes according to the invention we proceeded to measuring the welded spot under the following conditions:

2. Maintaining the Welding current at 9200 A: the diameter of the welded spot after 500 welding spots varies between 2.9 and 5.6 mm;

3. Stepwise incrementing from 9200 A to 10000 A over 400 spots: the diameter of the welded spot varies between 4.8 and 5.6 mm;

4. Stepwise incrementing from 9200 A to 9600 A over 400 spots: the diameter of the welded spot varies between 5.7 and 6.2 mm.

Under the conditions 3 it is thus possible, when using the electrodes of the invention, to double the number of welded spots, in comparison with a traditional electrode.

Under the conditions 1 the welding performance of the innovative electrodes is the same as that of the traditional electrodes.

Example 3: Sheet Welding Method—Increasing the Welding Current with an Electrode According to the Invention Because of its different electrical properties, and namely a better electrical conductivity of the electrode and a lower electrical resistance at the interface between the sheet and the electrode, the field of weldability of the innovative electrodes occurs with a higher welding current.

Figure 5:
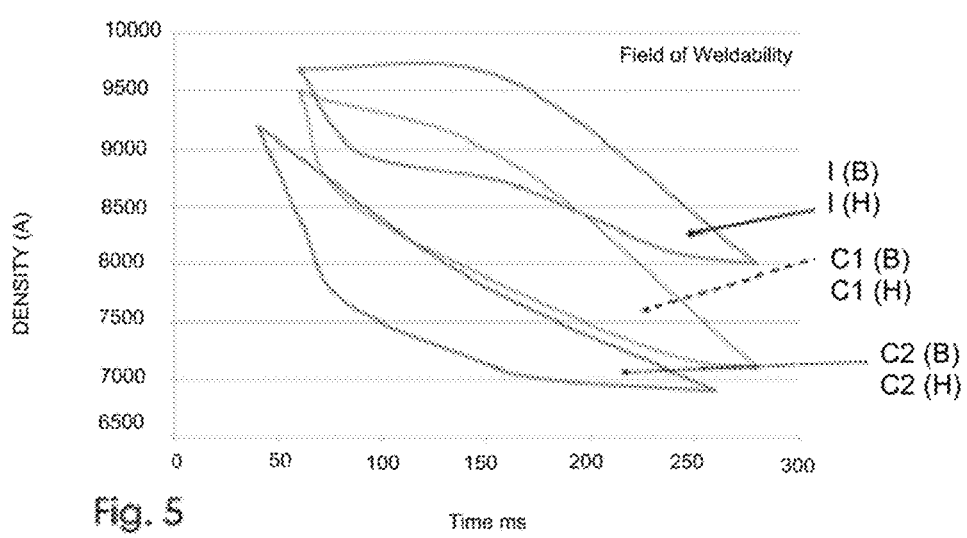
FIG. 5 is a graph showing the field of weldability for an electrode according to the invention (I (B)-I (H)) in comparison with two electrodes of the state of the art (C1 (B)-C1 (H) and C2 (B)-C2 (H)), the curves of the graph representing the density (A) as a function of the time (ms); it can be seen in this graph that the field of weldability of the electrodes of the invention is performed with a higher electrical density.

The field of weldability of the electrodes according to the invention, in comparison with two electrodes of the state of the art, is represented in the graph of FIG. 5.

Thus, for a frequency of 1000 Hz, the electrode according to the invention, with a welding current of 9200 A, permits 2400 welded spots.

As a comparison, one of the traditional electrodes, referenced under the name "C1" CuZr, with a current of 8600 A, only permits 600 welded spots.

In addition, another traditional electrode, referenced as "C2" CuCrZr, permits the welding of 1400 spots with a current of 7900 A.

It should be noted that the field of weldability is much wider depending on the welding time (number of periods) for the electrodes according to the invention (I (B) and I (H)), which is explained by the better creep resistance that limits the drop in current density. This wider field confirms the possibility, with electrodes according to the invention, of reducing the incrementation of currents for the same number of welded spots.

We claim:

1. A welding electrode being comprised of copper, chromium, zirconium alloy, and at least one of phosphorus and magnesium,
   wherein the proportion of chromium is between 0.4 and 0.8% by weight,
   wherein the proportion of zirconium is between 0.02 and 0.09% by weight, the total proportion of phosphorus and/or magnesium being higher than 0.005% by weight, with a proportion of magnesium lower than 0.1% by weight and a proportion of phosphorus lower than 0.03% by weight, the rest of the composition being copper,
   wherein the structure of the electrode comprises incoherent chromium precipitates, more than 90% of which have a projected surface area of less than 1 µm$^2$, said incoherent chromium precipitates having dimensions at least between 10 and 50 nm, said electrode having in addition a fibrous structure, visible in a cross-sectional view of the active face of said electrode after surfacing and chemical etching, and
   wherein said structure comprises a plurality of radial fibers, said fibers having a thickness of less than 1 mm, and a substantially fiberless central zone having a diameter of less than 5 mm, and the electrical conductivity of said electrode being higher than 85% IACS (International Annealed Copper Standard).

2. A method for manufacturing, comprising the steps of:
   continuous casting a welding electrode being comprised of copper, chromium, zirconium alloy, and at least one of phosphorus and magnesium,
   starting from an alloy comprising chromium in a proportion between 0.4 and 0.8% by weight, zirconium in a proportion between 0.02 and 0.09% by weight, said alloy comprising at least one of phosphorus and magnesium in a total proportion higher than 0.005% by weight, the proportion of magnesium being less than 0.1% by weight and the proportion of phosphorus being less than 0.03% by weight, the rest of the composition being copper,
   wherein said method comprises at least the following steps:
   a) melting of the various components of the alloy, namely copper, chromium, zirconium and phosphorus and/or magnesium at a temperature above 1200° C.;
   b) continuous casting through a cylindrical die having a diameter d, which permits to obtain a bar having a diameter close to the diameter d of the die with maintaining the metal liquid in the casting furnace at a temperature between 1100 and 1300° C.;
   c) solidification of said bar and cooling to a temperature below 100° C., the cooling rate being at least equal to 10° C./s until reaching a bar temperature of 1060° C., then at least equal to 15° C./s between 1060 and 1040° C., then at least equal to 20° C./s between 1040 and 1030° C., then at least equal to 25° C./s between 1030 and 1000° C., then at least equal to 30° C./s between 1000 and 900° C., then at least equal to 20° C./s for temperatures below 900° C., until the bar is cooled down to a temperature of not more than 100° C.;
   d) cold deformation in order to obtain a bar with a diameter smaller than 20 mm;
   e) aging or tempering treatment; and
   f) shearing of said bar in order to obtain pieces, then punching or machining by removal of material in order to provide said electrode with its final shape,
   wherein the metallurgical structure of the active face of said electrode includes incoherent chromium precipitates, more than 90% of which have a projected surface area of less than 1 µm$^2$, said incoherent chromium precipitates having dimensions between at least 10 and 50 nm, said electrode having in addition a fibrous structure, visible in a cross-sectional view of the active face of said electrode after surfacing and chemical etching, said structure being comprised, on the one hand, of a plurality of radial fibers, said fibers having a thickness of less than 1 mm, and a substantially fiberless central zone having a diameter of less than 3 mm, and the electrical conductivity of said electrode being higher than 85% IACS (for International Annealed Copper Standard).

3. The method for manufacturing according to claim 2, wherein the continuous casting of step b) is carried out with maintaining a temperature of the liquid metal in the casting furnace between 1150 and 1250° C.

4. The method for manufacturing according to claim 2, wherein the cooling of said bar of step c) is carried out at a cooling rate of at least 30° C./s for temperatures below 900° C., until the bar is cooled down to a temperature of not more than 100° C.

5. The method for manufacturing according to claim 2, wherein the aging treatment of step e) is carried out at a temperature between 450 and 500° C. for a period from 1 to 2 hours, or at a temperature of 550° C. for 10 to 30 minutes, or at a temperature of 500° C. for 30 minutes to 2 hours, or at a temperature of 450° C. for 2 hours to 6 hours, or at a temperature of 400° C. for more than 20 hours.

6. The method for manufacturing according to claim 2, wherein said diameter d of the die is between 20 and 70 mm.

7. The method for manufacturing according to claim 2, wherein, during the cold deformation step d), an external machining operation, less than 0.5 mm thick, is performed in order to eliminate the surface defects generated during the solidification step c).

8. A welding method, comprising the steps of:
   spot resistive welding at least two steel sheets coated with a coating of zinc or an alloy comprising zinc with a welding electrode being comprised of copper, chromium, zirconium alloy, and at least one of phosphorus and magnesium, wherein the proportion of chromium is between 0.4 and 0.8% by weight, wherein the proportion of zirconium is between 0.02 and 0.09% by weight, the total proportion of phosphorus and/or magnesium being higher than 0.005% by weight, with a proportion of magnesium lower than 0.1% by weight and a proportion of phosphorus lower than 0.03% by weight, the rest of the composition being copper, wherein the structure of the electrode comprises incoherent chromium precipitates, more than 90% of which have a projected surface area of less than 1 μm$^2$, said incoherent chromium precipitates having dimensions at least between 10 and 50 nm, said electrode having in addition a fibrous structure, visible in a cross-sectional view of the active face of said electrode after surfacing and chemical etching, wherein said structure comprises a plurality of radial fibers, said fibers having a thickness of less than 1 mm, and a substantially fiberless central zone having a diameter of less than 5 mm, and the electrical conductivity of said electrode being higher than 85% IACS (International Annealed Copper Standard), and wherein said coating has a thickness of less than 10 μm and said sheets having a thickness of less than or equal to 1.5 mm.

* * * * *